(12) United States Patent
Frei et al.

(10) Patent No.: US 8,544,697 B2
(45) Date of Patent: Oct. 1, 2013

(54) DOSING DEVICE FOR A BEVERAGE DISPENSING SYSTEM

(75) Inventors: Christian Frei, Oberriet (CH); Konstantin Mikirozis, Appenzell (CH)

(73) Assignee: Nestec S.A., Vevey (CH)

(*) Notice: Subject to any disclaimer, the term of this patent is extended or adjusted under 35 U.S.C. 154(b) by 260 days.

(21) Appl. No.: 12/994,519

(22) PCT Filed: May 27, 2009

(86) PCT No.: PCT/EP2009/056457
§ 371 (c)(1),
(2), (4) Date: Nov. 24, 2010

(87) PCT Pub. No.: WO2009/144246
PCT Pub. Date: Dec. 3, 2009

(65) Prior Publication Data
US 2011/0068121 A1    Mar. 24, 2011

(30) Foreign Application Priority Data

May 29, 2008   (EP) .................................... 08157188

(51) Int. Cl.
*G01F 11/24*   (2006.01)
(52) U.S. Cl.
USPC ............... 222/201; 222/233; 222/161; 222/1; 222/368
(58) Field of Classification Search
USPC ............... 222/368, 325, 231, 328, 228, 233, 222/234, 235, 226, 229, 247, 306, 129.3, 222/196, 197, 232, 243; 53/467, 468, 473, 53/475, 266.1
See application file for complete search history.

(56) References Cited

U.S. PATENT DOCUMENTS

| 165,406 | A | * | 7/1875 | Burke | 222/306 |
|---|---|---|---|---|---|
| 355,740 | A | * | 1/1887 | Winchell | 222/310 |
| 1,863,133 | A | * | 6/1932 | Ziedins | 222/303 |
| 2,123,318 | A | * | 7/1938 | Taylor | 222/231 |
| 2,141,815 | A | * | 12/1938 | Kelly Leo J | 222/225 |
| 2,708,534 | A | * | 5/1955 | Mason et al. | 222/310 |
| 3,616,969 | A | * | 11/1971 | Koizumi | 222/161 |
| 4,013,198 | A | * | 3/1977 | Miklas | 222/438 |
| 5,301,844 | A | * | 4/1994 | Ricciardi | 222/199 |
| 5,381,967 | A | * | 1/1995 | King | 239/659 |
| 6,182,869 | B1 | * | 2/2001 | Birky | 222/196 |
| 6,382,470 | B1 | * | 5/2002 | Hu et al. | 222/203 |
| 2004/0011807 | A1 | * | 1/2004 | Knepler | 222/67 |
| 2007/0044665 | A1 | | 3/2007 | Kirschner et al. | |
| 2012/0088022 | A1 | * | 4/2012 | Carbone et al. | 426/506 |
| 2012/0228327 | A1 | * | 9/2012 | Brunner et al. | 222/129.4 |

FOREIGN PATENT DOCUMENTS

| EP | 0560064 | 9/1993 |
|---|---|---|
| EP | 1852044 | 11/2007 |

* cited by examiner

*Primary Examiner* — J. Casimer Jacyna
*Assistant Examiner* — Charles P Cheyney
(74) *Attorney, Agent, or Firm* — K&L Gates LLP

(57) ABSTRACT

The invention proposes a dosing device (1) for the preparation of a food composition comprising supply means (2) for providing a soluble powder, a dosing member (3) which is rotatably mounted and which comprises at least one recessed portion (4) for receiving powder supplied by the supply means (2) in a first rotational position and discharging powder in a second rotational position, and tapping means (5) driven by the rotation of the dosing member (3) and designed to induce a reciprocating force on the supply means (2).

13 Claims, 6 Drawing Sheets

DOSING DEVICE FOR A BEVERAGE DISPENSING SYSTEM

BACKGROUND OF THE INVENTION

The present invention relates to the field of beverage dispensing systems which utilize soluble food ingredients. More particularly, the present invention relates to a dosing device for accurate dosing of a powder.

A beverage dispenser according to the invention is a device that prepares a beverage from one or more beverage ingredients by having the ingredients interact with a liquid. In some types of beverage dispensers, beverage sources that include concentrates and/or powders are mixed with a liquid, such as water for example, in order to prepare a beverage. Thereby, in particular in the field of hot beverages such as coffee, tea or hot chocolate, powders are used for the preparation of the beverage.

The known beverage dispensers therefore comprise a dosing device for dosing a predefined amount of soluble powder stored in a storage chamber into a mixing chamber or into a dedicated vessel. Therein, liquid can be introduced in order to interact with the soluble powder and hence, form a food composition.

A known problem with such a dosing device is the accurate dosing of the powder since powder may form loose and/or hard clumps, cliff building, bridges, or triangular or pyramidal piles within the storage chamber which have a significant influence on the powder supply and dosing operation of the device. This problem occurs even more frequently in regions with high humidity since moisture supports the agglomeration of the powder. Accordingly, powder can remain caught inside the storing chamber and then does not freely flow into the dosing means.

Therefore, vibrating devices have been developed for improving the dosing operation of powdered material from a supply or storage chamber. However, powder tends to get compacted by the vibration exerted thereon.

U.S. Pat. No. 5,381,967 teaches a hopper which is vibrated in order to dispense a beverage powder. The disclosed apparatus comprises a flexible body and an actuating mechanism coupled therewith to impart motion to the flexible body at a frequency sufficient low to correspond to a non-vibrating mode.

EP 560 064 describes a dosing device cooperating with a spring placed inside a powder storing tank so that during rotation of the dosing device, the spring induces a reciprocating movement to the powder inside the powder storing tank.

U.S. Pat. Nos. 2,123,318, 2,141,815 and US 2007/0044665 also describe dosing device cooperating with respectively a spring, a resilient yoke and a vibrating arm that are put under tension and then suddenly released for providing vibration through the powder.

In the above prior art, the means for vibrating the powder are placed inside the powder tank. Then these means can induce hygienic problems, require cleaning—especially if the dosing device has not worked during a long time—and are not easily accessible for the beverage dispenser operator.

Based on the prior art, an apparatus is sought-after which improves the evacuation of powder from a dedicated container or storage chamber. Moreover, with respect to the consistency of the food product to be prepared, an apparatus is sought-after which improves the accurate dosing of a soluble powder.

It is a further aim of the invention to provide a cost-saving embodiment of low complexity which enables an evacuation of powder from a dedicated container without the need of an additional motor.

Moreover, in order to enable a broad application area of the device, a solution is sought-after which is not overly noisy.

Lastly, an aim of the invention is to provide an apparatus which minimises hygienic issues and provides the operator with an easy handling either for cleaning or repairing.

The present invention seeks to address the above described problems.

OBJECT AND SUMMARY OF THE INVENTION

In a first aspect, the present invention relates to a dosing device for the preparation of a food composition comprising:
  supply means for providing a soluble powder,
  a dosing member which is rotatably mounted and which comprises at least one recessed portion for receiving powder supplied by the supply means in a first rotational position and discharging powder in a second rotational position, and
  tapping means driven by the rotation of the dosing member and designed to induce a reciprocating force on the supply means resulting in a reciprocating ("shaking") movement of the supply means.

With a device according to the present invention, it is possible to provide a soluble powder to a beverage dispensing system. Therein, the soluble powder is preferably discharged into a mixing chamber of such a device and thus, a liquid such as water can be made to interact with the powder in order to form a food composition such as a soup or a beverage for example.

The supply means may be a vessel, a tin or any other means suitable for providing a powder to the dosing member of the device. Moreover, the supply means may as well be a housing for receiving a vessel containing a soluble powder such as a tin for example.

The dosing member is a rotating element which is preferably connected to the supply means. The connection between the supply means and the dosing member is preferably funnel shaped. Accordingly, the powder which is supplied by the supply means can effectively be guided to the dosing member.

Moreover, the dosing member is preferably arranged beneath the supply means. Hence, the powder can be provided to the dosing member due to gravity. Accordingly, a cost-saving arrangement of the dosing device is achieved. However, the supply means may as well comprise additional means for supporting the provision of powder to the dosing member, e.g. air supplying means for actively generating an air flow.

The powder supplied to the dosing member is received by the recessed portion thereof. The recessed portion is preferably an elongated recess which is void of sharp edges. Preferably, the elongated recess comprises round edges such that the possibility of powder getting stuck in the recessed portion is minimized and the receiving and discharging of powder is supported.

As the dosing member and hence, the recessed portion thereof rotates with respect to the supply means, a controlled amount of powder is dispensed by the dosing member. Thereby, the recessed portion is provided with a predefined amount of powder in a first rotational position of the dosing member. After the recessed portion is supplied with powder, the dosing member is rotated to a second rotational position of the dosing member. The angle of rotation of the dosing member can be varied and is preferably controlled by a control unit. At said second rotational position, which is preferably different from the first rotational position, the powder is discharged from the dosing member. The second rotational position of the dosing member is preferably a position in which the recessed portion is facing downwardly such that the powder within the recessed portion is discharged by gravity. Furthermore, additional means may be provided for supporting the discharging of the powder from the recessed portion. For example air supplying means for actively generating an air flow or mechanical means for discharging the recessed portion may be provided at the dosing member or the device.

The volume to be dispensed by the dosing member can be defined by the volume of the recessed portion. Hence, by varying the measures and the geometric shape of the recessed portion, a desired volume of powder can be dispensed.

In a preferred embodiment, a multitude of recessed portions is provided at the dosing member in order to enable a faster dispensing process of powder from the dosing device. Therein, the recesses are preferably arranged circumferential at the dosing member. Hence, by rotating the dosing member, one after another of said recessed portions can be supplied with powder by the supply means at a predefined rotational position of the dosing member. Consequently, by rotating the dosing member, one after another of said recessed portions can be discharged at another predefined rotational position of the dosing member. It should be understood that the measures and the geometric shape of the recessed portions may vary for each of the recessed portions.

For controlling the amount of powder to be dispensed by the dosing device, a motor is preferably connected to the dosing device. Moreover, a control unit is preferably connected to the dosing member in order to control the rotational movement of the dosing member with respect to the supply means. Hence, by controlling and counting the number of times that the cavities are filled, rotated, and discharged, the amount of powder dosed by the device can effectively be controlled.

The rotational movement of the dosing member drives tapping means which induce a reciprocating force on the supply means. Hence, tapping of the supply means is obtained without the need of an additional motor for the tapping means.

The dosing member is preferably of cylindrical form and comprises at least one activation member for interacting with the tapping means. Said activation member is preferably a pin or a bolt extending in axial direction of the dosing member. Moreover, the pin or bolt is preferably located eccentrically to the axis of the dosing member.

In a preferred embodiment, the tapping means comprise an elastic member being securely connected to the supply means such that in an original position of the elastic member no force is exerted on the elastic member. Accordingly, in its original position, the elastic member is in a strainless condition. The elastic member is preferably a blade of metal or another material which is suitable for inducing a strong force on the supply means.

The tapping means are preferably mounted at the device in such a way that the activation member of the dosing member can be brought into contact with at least one ending of the tapping means. Besides, according to a preferred embodiment of the invention, the elastic member is fixed to the outside wall of the supply means. When the tapping means are placed outside the supply means, there is no direct contact between the tapping means and the soluble powder and the hygiene of the dosing device is improved. Moreover, the tapping means are easily accessible to the operator when they need to be cleaned or fixed. In fact, due to the recurrent force exerted on the tapping means, these elements may be sometimes replaced by new ones. This embodiment is also preferred when the supply means is a housing for receiving a vessel containing a soluble powder or when the dosing means are connected to the supply means by a funnel-shaped element because due to the absence of direct interaction between the tapping means and the powder stored in or flowing through the supply means, the vessels or tins can be easily removed and re-inserted.

In a preferred embodiment, the activation member is designed to be able to deflect the elastic member to a predefined extent compared to the original position of the elastic member. Hence, by deflecting the elastic member, a force can be transmitted from the activation member to the elastic member. Thereby, the activation member is arranged at the dosing member such that a rotational movement of the dosing member and hence of the activation member causes a deflection of the elastic member. Moreover, a further rotational movement of the dosing member and thus, of the activation member results in a sudden release of the deflected elastic member. After the disengagement of the activation member and the deflected elastic member, the elastic member is oscillating with respect to its original position.

Due to a continuous rotation of the dosing member, the activation member will deflect and thus release the elastic member continuously. Thereby, the frequency of interaction of the activation member and the elastic member is dependent on the rotational speed of the dosing member.

As the elastic member is stably connected to the supply means, the oscillating elastic member induces a reciprocating force on the supply means. The reciprocating force induced is preferably a lateral reciprocating force in order to effectively provide a tapping of the supply means. Accordingly, a powder housed by the supply means or within a tin housed by the supply means can effectively be prevented from forming bridges, pyramidal piles or the like. Hence, the evacuation of the powder by gravity is enforced due to the tapping means. Preferably, the reciprocating force induced on the supply means results in high reciprocating amplitude and a relatively low frequency such that compression of the powder within the supply means can be prevented. According to this embodiment, the powder can effectively be provided to the at least one recessed portion of the dosing member. Thus, the dosing device can provide accurate dosing portions in order to enhance the consistency of the product to be prepared. An advantage of the present invention is that the tapping means have an indirect effect on the soluble powder rather than a direct effect as described in the prior art solutions. Actually, the tapping means exert a direct action on the supply means, which transfer the reciprocating movement they are subjected to on the powder. The same effect of breaking bridges and pyramidal piles inside the powder is obtained with a simpler and safer implementation for the operator.

As the elastic member is freely oscillating after its release and before the subsequent deflection by the activation member, the embodiment according to the present invention provides a relatively quiet solution of inducing a reciprocating movement of the supply means.

It should be understood that the elastic member can be directly connected to the supply means or by means of an intermediate member linked to the supply means. Thereby, the intermediate member may be designed to effectively transmit the reciprocating force of the elastic member to the supply means.

In another preferred embodiment, at least one additional pin is arranged in parallel to said first pin. Preferably, the pins are arranged at a side portion of the dosing member such that the first and the second pin are arranged at an angle of 180° with respect to the centre axis of the dosing member. As two activation members are provided, the frequency of interaction between the dosing member and the elastic member can effectively be raised. Moreover, by varying the angle between the two pins, the point of time of the deflection of the elastic member caused by the first and the second pin can be adjusted. Hence, the tapping frequency of the tapping means can effectively be adjusted to certain needs. Preferably, the activation member is arranged such that a tapping of the supply means is obtained each time, a dose of powder has to be supplied to a recessed portion of the dosing member when it is in a receiving position.

In a preferred embodiment, the dosing member comprises screw threads at either end of the at least one recessed portion. Thereby, the screw threads are preferably formed circumferentially to the dosing member. Moreover, the screw threads are preferably covered by a mounting element of the dosing member. Thereby, the screw threads are preferably connected to at least one recessed portion of the dosing member. Accordingly, small grains of the powder which may escape from the recessed portion and may slide between the dosing member and the mounting element thereof can be caught.

Preferably, the screw threads on either side of the recessed portion are orientated in opposing ways. Moreover, the orientation of the screw threads is preferably chosen to be opposite to the sense of rotation of the dosing member. Hence, both screw threads can effectively catch small grains of powder and guide these grains back into the recessed portion of the dosing member. Accordingly, hygiene of the dosing device can be maintained and jamming of the dosing device can effectively be prevented.

In a second aspect, the present invention relates to a system for the preparation of a food composition which comprises supply means for supplying a soluble powder to the system, at least one rotatable dosing member which comprises a recessed portion for receiving and discharging a predefined dose of powder into a provided vessel, liquid supply means for providing a liquid to the vessel for mixing the powder, control means for controlling the angle of rotation and the rotational speed of the dosing member, and tapping means placed outside the supply means which are driven by the rotation of the dosing member and which are designed to induce a reciprocating force on the supply means.

With a system according to the present invention, it is possible to provide a correct dose of soluble powder to a dedicated vessel which can be provided by an operator for example. Thereby, the control means control the angle of rotation and the rotation speed of the dosing member in order to bring the recessed portion of the dosing member into a first rotational position in which powder can be supplied to the recessed portion by means of the supply means, and to bring the recessed portion into a second rotational position in which the powder within the recessed portion can be discharged. Preferably, the control means are connected to a motor which drives the dosing member.

Furthermore, the rotation of the dosing member induces a reciprocating force on the supply means due to tapping means connected thereto in order to prevent the powder from forming bridges, pyramidal piles or the like within the supply means. Accordingly, the evacuation of the powder form the supply means is enforced.

After the powder has been supplied to the vessel, the liquid supply means selectively supply a predefined amount of liquid such as water to the vessel. Hence, an interaction of the liquid and the soluble powder is enabled in order to form a beverage. Thereby, the system preferably comprises a heater such that the liquid can be provided to the vessel at a predefined temperature. Moreover, the system preferably comprises a pump such that the liquid can be provided to the cup at a predefined pressure. Thereby, the control means of the device are preferably connected to the pump and the heater in order to control the temperature and/or the pressure of the liquid.

In a preferred embodiment, the system further comprises air generating means for supporting the delivery of powder from the dosing means to the vessel. Thereby, the air generating means supply an air stream within the system such that the discharging of the dosing means is enhanced and the powder can effectively be provided to the vessel.

In a third aspect, the present invention relates to a method for tapping supply means suitable for supplying a soluble powder to a dosing member which comprises at least one recessed portion for receiving and discharging powder supplied by the supply means, wherein a rotational movement of the dosing member induces a reciprocating force on the supply means resulting in a reciprocating ("shaking") movement of the supply means and wherein the tapping means are placed outside the supply means.

The method according to the invention enables the tapping of supply means in order to prevent the powder from forming piles, bridges or the like which may negatively influence the dosing of powder. Thereby, the reciprocating force exerted on the supply means is preferably of high amplitude and low frequency such that a compression of the powder within the supply means is effectively prevented.

Preferably, the method comprises the steps of deflecting and releasing tapping means connected to the supply means. Hence, no permanent mechanical connection is established between the tapping means and the dosing member. Since, the tapping means are made to oscillate freely after the releasing thereof, a relatively quiet operation of the tapping means is enabled.

The method is preferably applied for beverage preparation machines in which a food soluble powder is dosed to be mixed with a diluent in a mixing chamber or directly in a cup. However, other applications of the method according to the invention are possible.

BRIEF DESCRIPTION OF THE DRAWINGS

Further features, advantages and objects of the present invention will become apparent for the skilled person when reading the following detailed description of embodiments of the present invention, when taking in conjunction with the figures of the enclosed drawings.

DETAILED DESCRIPTION OF EMBODIMENTS

Figure 1:
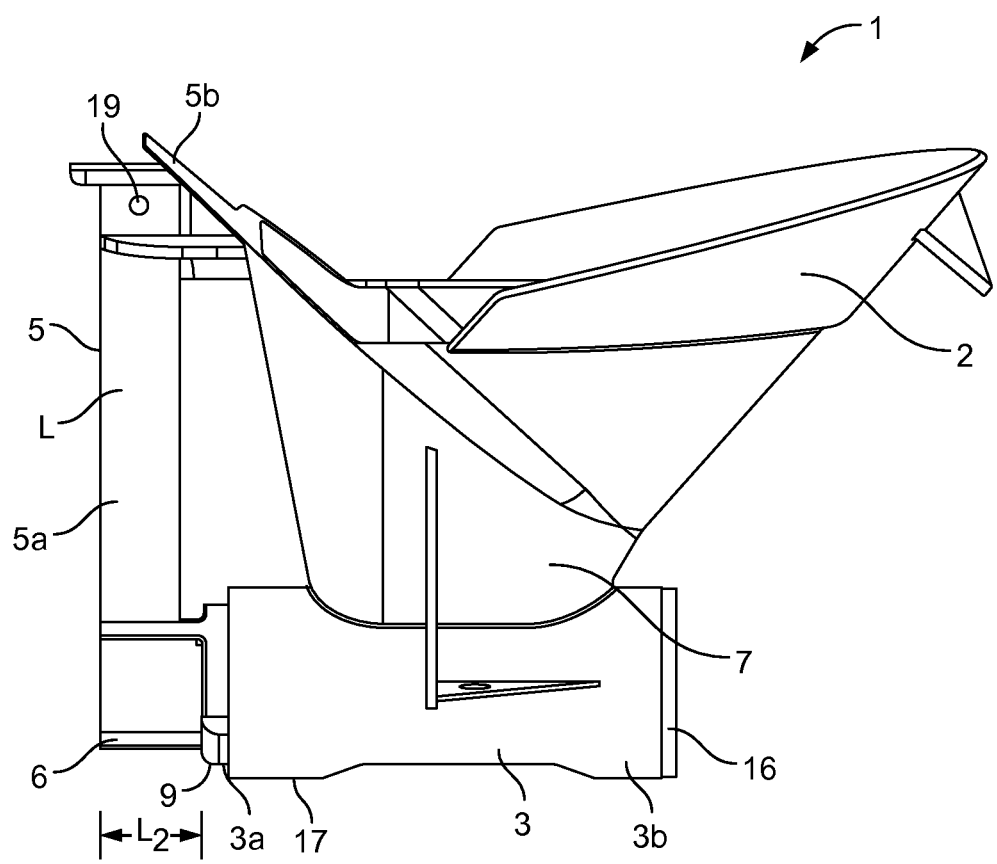
FIG. 1 shows a side view of a preferred embodiment of the dosing device according to the present invention.

FIG. 1 shows a preferred embodiment of the dosing device 1 according to the present invention in side view. The dosing device comprises supply means 2 which are suitable for supplying a soluble powder to a dosing member 3. The supply means 2 are preferably designed for receiving and/or housing a container or tin 11 which contains soluble powder. Thereby, the opening of the container or tin 11 is preferably facing downwards such that powder contained within the tin or container can be discharged therefrom by means of gravity.

As can be seen in the figure, the dosing member 3 is preferably arranged beneath the supply means 2. Hence, the soluble powder is supplied by means of the supply means 2 or the container or tin housed by the supply means to the dosing member 3 due to gravity. The supply means 2 is preferably made of plastics, e.g. by injection moulding. The supply means 2 may however be made of other material such as metal.

The supply means 2 is preferably connected to the dosing member 3 by means of a funnel-shaped element 7. Hence, powder provided by the supply means 2 can effectively be guided to the dosing member 3. Thereby, the funnel-shaped element 7 and the supply means 2 are preferably formed as an integral part.

The dosing member 3 is preferably of cylindrical form and rotatably mounted at the device 1 by means of a mounting portion 17. Said mounting portion is preferably formed as an integral part of the supply means 2 and the funnel-shaped element 7. The mounting portion 17 is preferably a tubular element suitable for receiving and mounting the cylindrical dosing member 3. Other means for mounting the dosing member 3 may as well be provided such as two circular bearings connected to the supply means 2 or the funnel-shaped element 7.

The mounting portion 17 comprises at least two apertures 18a,18b which are preferably of equal size. The apertures 18a,18b are formed at the lateral surface of the tubular mounting portion 17. Thereby, the first aperture 18a is connected to the funnel-shaped element 7. Hence, powder supplied by the supply means 2 can be guided by means of the funnel-shaped element 7 to the first aperture 18a. The other aperture 18b is preferably located at an opposing side of the lateral surface of the tubular mounting portion 17. As the dosing member 3 is housed by the tubular mounting portion 17, the powder supplied to the first aperture 18a is prevented from being discharged through the second aperture 18b.

The dosing member 3 is releasably connected to the mounting portion 17 by means of connection means 16, 9. Thereby, the connection means preferably comprise a flange portion 16 at a first front surface 3b of the dosing member 3 and a latch member 9 which is disposed at an opposing front surface 3a of the dosing member 3. Preferably, the latch member 9 interacts with the mounting portion 17 in order to enable a stable connection between the dosing member 3 and the mounting portion 17. As the dosing member 3 is releasably connected to the mounting portion 17, a convenient disassembly of the device is possible, e.g. for maintenance purposes.

The mounting portion 17 may comprise bearings for minimizing the frictional forces between the rotatable dosing member 3 and the mounting portion 17.

In a preferred embodiment, drive means 10 are connected to the dosing member 3 in order to enable a rotation thereof. These drive means may comprise a motor, such as an electric motor, and a control unit 14 (see FIG. 6) for adjusting the rotational speed and the angle of rotation of the dosing member 3 with respect to the mounting portion 17 and the supply means 2. Therefore, means for measuring the rotational displacement of the dosing member 3 may be provided and connected to the control unit 14. The drive means 10 are preferably connected to the flange portion 16 of the dosing member 3.

The dosing member 3 further comprises an activation element 6 which is located at a front surface 3a thereof. The activation element is preferably a pin which is protruding in axial direction of the dosing member 3. Thereby, the pin 6 is preferably arranged eccentric to the axis of rotation of the dosing member 3. The length $L_2$ of the pin 6 is preferably between 5 mm and 20 mm such that an interaction between the pin 6 and tapping means 5 of the device 1 is enabled.

The tapping means 5 of the device 1 are connected to the outside wall of the supply means 2. Thereby, the tapping means 5 comprise a connecting element 5b which is mounted at the outside of the supply means 2. Preferably, said connecting element 5b is an integral part of the supply means 2. Hence, force transmitted to the connection element 5b can be effectively induced on the supply means 2 and then to the powder present in the supply means 2. The tapping means 5 further comprise an elastic member 5a which is stably connected to the connection element 5b. The elastic member 5a is preferably an elastic metal blade of a predefined width L.

The connection between the elastic member 5a and the connecting element 5b is preferably established by a clamp, a screw fitting 19 or a bolted connection. Hence, the connection is designed releasably such that an exchange of the elastic member 5a for maintenance or exchange purposes is enabled.

Figure 6:
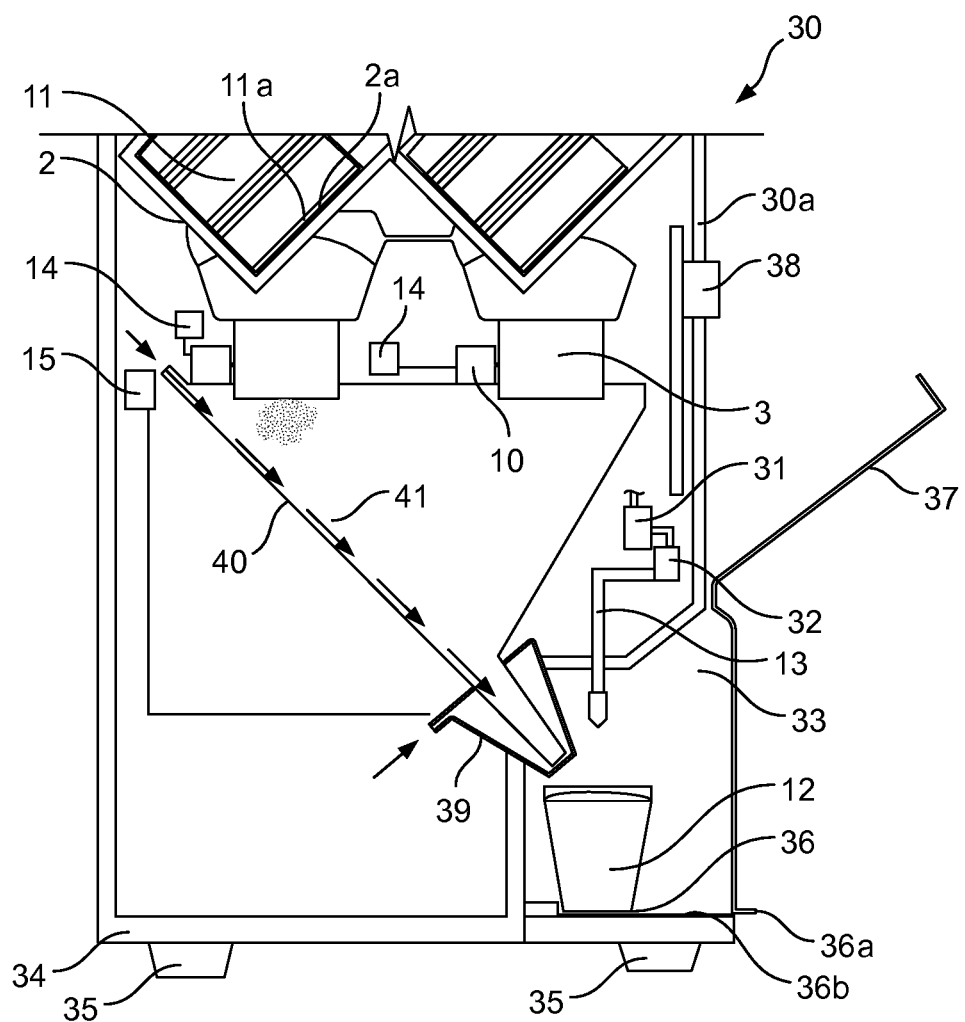
FIG. 6 shows a sectional side view of a preferred embodiment of the system according to the present invention

As shown in FIG. 1, the connecting element 5b is preferably disposed at an upper part of the supply means 2 such that tapping can effectively be directed to the supply means 2 or to a container or tin 11 housed by the supply means 2 (see FIG. 6). The elastic member 5a of the tapping means 5 preferably extends from the upper part of the supply means 2 towards the lower part thereof, at which position the dosing member 3 is mounted. Moreover, the elastic member 5a is disposed such that the activation element 6 of the dosing member 3 can be selectively brought to interact with the elastic member 5a by a rotational movement of the dosing member 3.

When being mounted at the connecting element 5b, the elastic member 5a is in a strainless state. However, by rotating the dosing member 3, the pin 6 is brought into contact with the elastic member 5a and thus, by a further rotational movement of the dosing member 3, a deflection of the elastic member 5a is obtained due to the interaction of the pin 6 and the elastic member 3. As the dosing member 3 experiences a further rotational movement, the elastic member is suddenly released and made to oscillate. Thus, a reciprocating force is transmitted by the oscillating elastic member and thus, a reciprocating force is induced on the supply means 2 by means of the connecting element 5b. Accordingly, tapping with a high amplitude and low frequency compared to known vibrating means can be exerted on the supply means 2 which ensures a proper flow of powder from the supply means 2 or a container or tin 11 housed by the supply means 2 to the dosing member 3.

By means of the rotational velocity of the dosing member 3, the frequency of deflection as well as the time in which the elastic member is allowed too oscillate freely can be adjusted to given needs by the control unit 14 connected to the motor 10.

The operation of the dosing member 3 will be further explained with reference to FIGS. 2 and 3.

Figure 2:
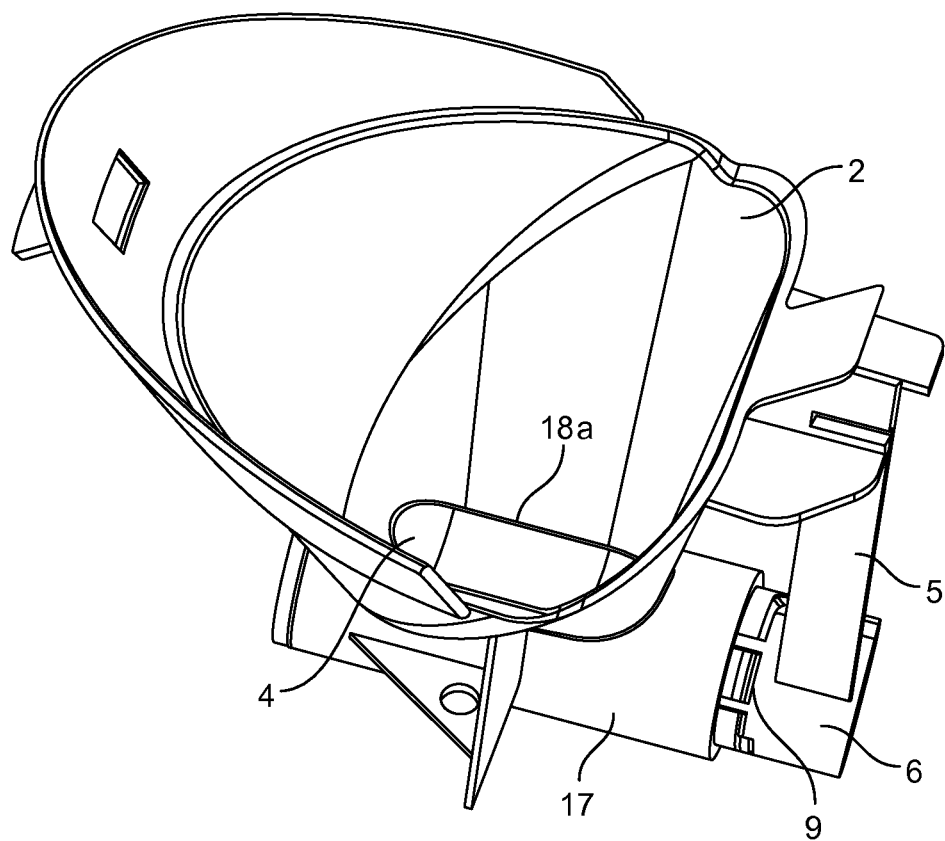
FIG. 2 shows a top view of a preferred embodiment of the dosing device according to the present invention.

FIG. 2 shows a top view of a preferred embodiment of the dosing device 1 according to the present invention. As can be seen from the figure, the dosing member 3 comprises at least one recessed portion 4 for receiving a predefined amount of powder supplied by the supply means 2. Said recessed portion is preferably an elongated recess formed in the lateral surface of the cylindrical dosing member 3. Preferably, the recessed portion holds about 0.1 g to 10 g of powder. The geometric measures of the recessed portion 4 at the lateral surface of the cylindrical dosing member 3 correspond to the geometric measures of the aperture 18a of the mounting portion 17.

In a first rotational position of the dosing member 3 in which the recessed portion 4 is brought to face the aperture 18a, a predefined amount of powder can be supplied by the supply means 2 to the recessed portion 4 of the dosing member 3. Thereby, the amount of powder to be received by the recessed portion 4 is defined by the volume of the recessed portion 4. In order to enhance the supply of powder and to enforce the powder to flow into the recessed portion 4, the activation element 6 is arranged at the dosing member such that an activation of the tapping means is obtained when the recessed portion is in the above described receiving position.

After the powder has been supplied to the recessed portion 4, the motor 10 is activated in order to rotate the dosing member 3 with respect to the supply means 2 and hence, with respect to the aperture 18a of the mounting portion 17. Hence, shearing of the powder occurs at the circumferential edge of aperture 18a. Due to a further rotational movement of the dosing member 3, the aperture 18a is fully covered by the lateral surface of the cylindrical dosing member 3.

Figure 3:
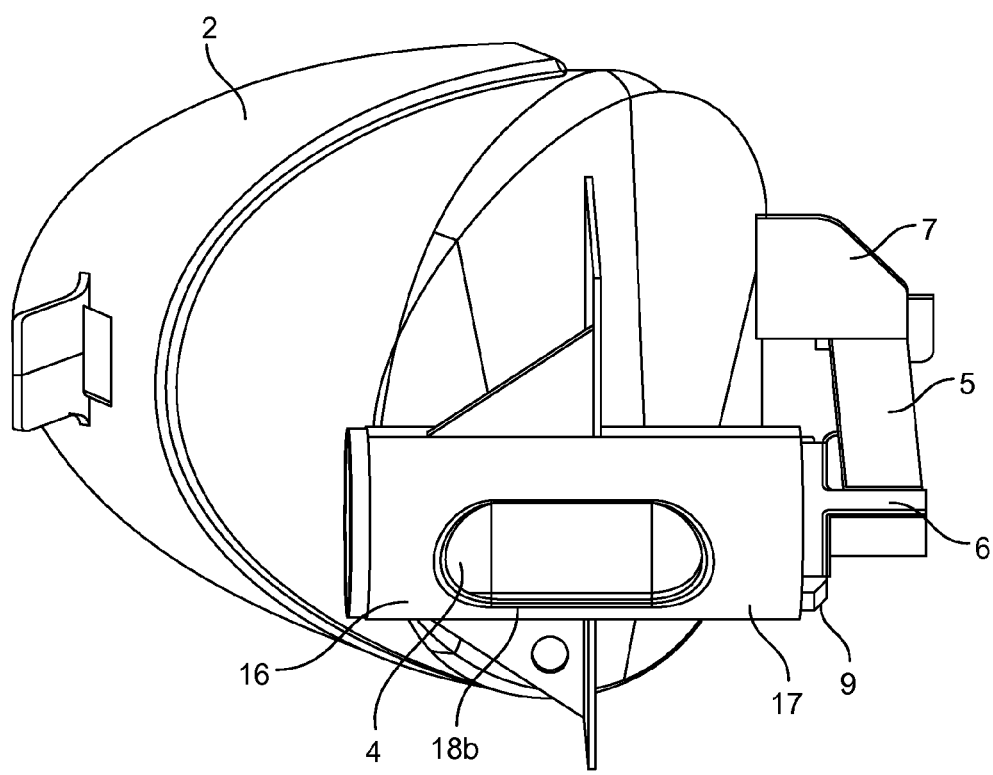
FIG. 3 shows a bottom view of a preferred embodiment of the dosing device according to the present invention.

FIG. 3 shows a bottom view of a preferred embodiment of the dosing device 1 according to the present invention. As already described, the mounting portion 17 comprises a second aperture 18b which corresponds to the first aperture 18a and which is preferably situated at a position on the lateral surface of the mounting portion 17 which is facing downwardly.

At a second rotational position of the dosing member 3, the recessed portion 4 is facing the second aperture 18b. Hence, the dose of powder which has been supplied to the recessed portion 4 can effectively be discharged by means of the aperture 18b when the motor connected to the dosing member 3 brings the dosing member 3 in said second rotational position.

The discharging of the recessed portion 4 is preferably obtained by means of gravity. Hence, the powder contained within the recessed portion 4 falls down into a dedicated mixing chamber or a vessel 12 (see FIG. 6) and can thus be made to interact with liquid for example. According to this embodiment, a predefined amount of powder can be dosed from the supply means 2.

The rotational movement of the dosing member 3 can be continuously or step-wise. In a preferred embodiment, the rotational movement of the dosing member 3 is continuously. Thereby, the rotational movement of the dosing member 3 is preferably slow enough such that the at least one recessed portion 4 at the dosing member 3 can be completely filled with powder. If more than one recessed portions 4 is provided at the dosing member 3, the plurality of recessed portions 4 can be filled completely with powder accordingly. Moreover, the rotational movement of the dosing member 3 may be interrupted, i.e. the dosing member 3 is stopped, at the first receiving position and at the second discharging position of thereof. This can be in particular useful, if the recessed portion 4 cannot be filled completely with powder by means of a continuous rotational movement of the dosing member 3. Hence, a filling of the recessed portion with powder to a maximum extent at the receiving portion is enabled. Moreover, discharging of the whole dose of powder from the recessed portion in the discharging position is enabled without powder being kept therein. Accordingly, a correct and consistent dosing process is enabled.

Figure 4:
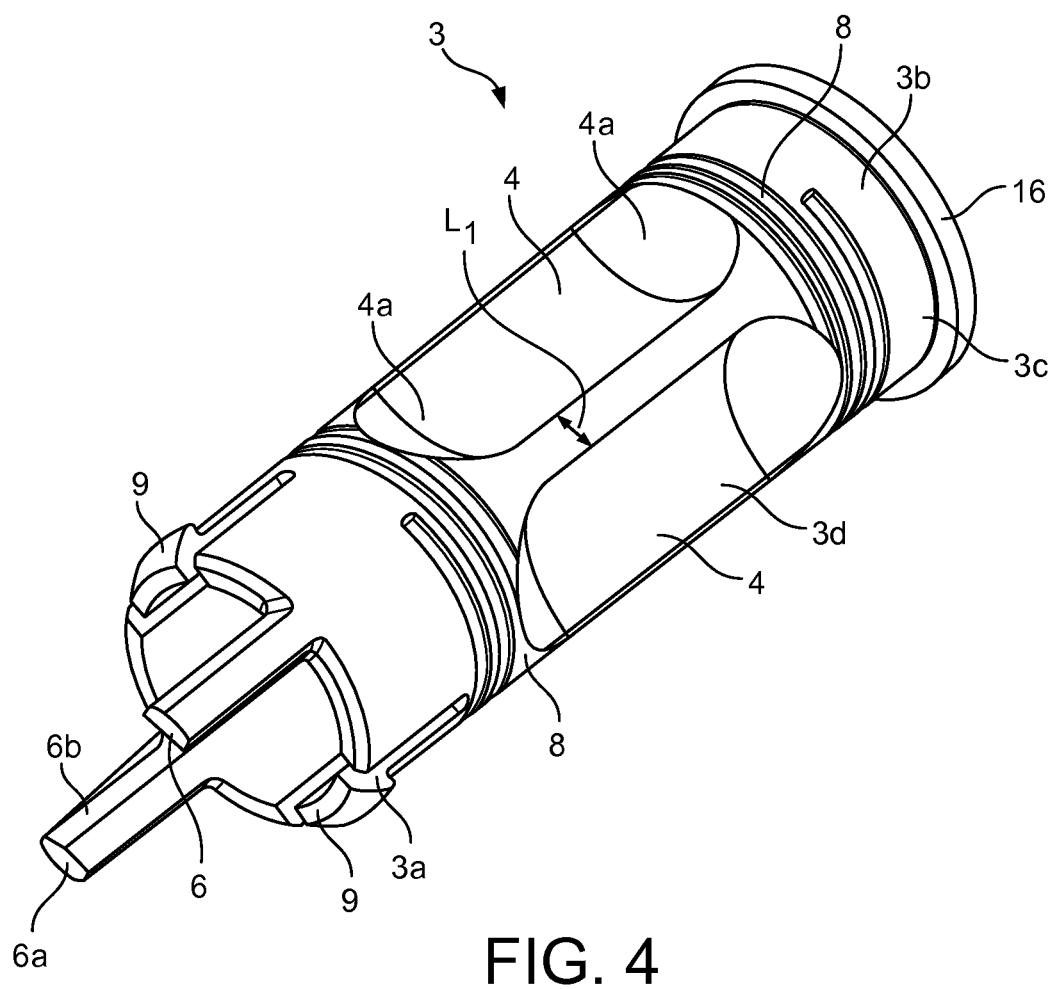
FIG. 4 shows a perspective side view of a preferred embodiment of the dosing member according to the present invention.

FIG. 4 shows a perspective side view of a preferred embodiment of the dosing member 3. As can be seen in FIG. 4, the dosing member 3 comprises preferably one to five recessed portions 4 which are arranged circumferentially at the lateral surface 3c of the cylindrical dosing member 3. However, even more recessed portions 4 can be provided at the dosing member 3, dependent on the measures of the dosing member 3 and of the recessed portions 4. Thereby, bars 3d of the lateral surface 3c which have a predefined width $L_1$ are separating the recessed portions 4 from each other. The recessed portions 4 are preferably of equal shape. However, the shape of the recessed portions 4 may vary in order to vary the powder dose to be discharged by the dosing member 3. Moreover, the recessed portions 4 preferably comprise round edges 4a. Hence, the recessed portions 4 are void of sharp edges. Accordingly, no powder is stuck inside the edges and the receiving and discharging process of the recessed portion is enhanced.

As can be seen from FIG. 4, the activation member 6 is disposed at a side portion 3a of the dosing member 3. The side portion 3a is preferably of hollow design in order to enable a movement of the latch member 9. The activation member 6 is preferably a pin of length $L_2$ suitable for interacting with the tapping means 5. The activation member 6 is preferably at least one pin arranged eccentric to the axial direction of the dosing member 3. Moreover, at least one second pin 6a of equal shape may be connected to the side portion 3a of the dosing member 3. The second pin 6a and the first pin 6 are preferably connected by a connection portion 6b in order to support the pins 6, 6a. Thereby, the pins 6, 6a are preferably arranged at an angle of 180° with respect to the centre axis of the dosing member 3. However, the first and second pin 6, 6a may be arranged at another angle. Hence, the activation of the tapping means by the pins 6, 6a can be influenced and thus, the frequency of activation of the tapping means 5 can be adjusted to given needs.

In a preferred embodiment, the pins 6, 6a are arranged at a predefined angle to the recessed portions 4. Hence, when interacting with the tapping means 5 during rotation of the dosing member 3, the pins 6, 6a are preferably releasing the elastic member 5a shortly before one of the recessed portions 4 is brought into its receiving position. Hence, as the elastic member 5a is freely oscillating, a reciprocating force is induced on the supply means 2 in order to enforce the powder to be discharged from the supply means 2 or a container or tin 11 housed by the supply means 2 into one of the recessed portions 4 of the dosing member 3. Accordingly, an adjustment of the activation of the tapping means 5 with respect to the rotational motion of the dosing member 3 is enabled.

It should be understood that according to the shown embodiment, the motor 10 and the control unit 14 are preferably designed to enable a continuous or step-wise rotational motion of the dosing member 3. Hence, one after another of the recessed portions 4 is brought to a first receiving position and to a second discharging position of the dosing member 3. Thereby, due to the rotational movement of the dosing member 3, a continuous activation of the tapping means 5 is obtained by the interaction of the activation means 6, 6a and the tapping means 5. Hence, effective tapping of the supply means 2 is obtained in order to enforce the powder to fall from the supply means 2 into the recessed portion 4 being in contact with the supply means. Accordingly, the accuracy and the consistency of the powder doses to be dosed by the device 1 are enhanced.

In a preferred embodiment, the dosing member 3 comprises screw threads 8 which are located at either side of the recessed portions 4. The screw threads 8 are preferably orientated in different ways. Moreover, the screw threads 8 are orientated in an opposite way compared to the rotational movement of the dosing member 3. Thereby, the screw threads 8 are preferably in contact with at least one of the recessed portions 4. Hence, in case small grains of powder escape from the recessed portions 4 and slide between the dosing member 3 and the mounting portion 17, these grains can be caught by the screw threads 8 and can be guided back to the at least one recessed portion 4 being connected to the screw threads 8, due to the orientation of the screw threads compared to the sense of rotation of the dosing member 3. Hence, jamming of the dosing member 3 can effectively be prevented and the hygiene of the dosing device is enhanced.

Figure 5A:
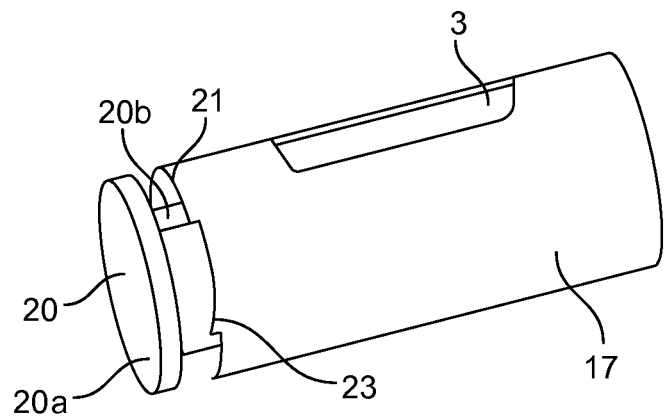
FIG. 5*a* shows a perspective side view of another preferred embodiment of the dosing member according to the present invention.
Figure 5B:
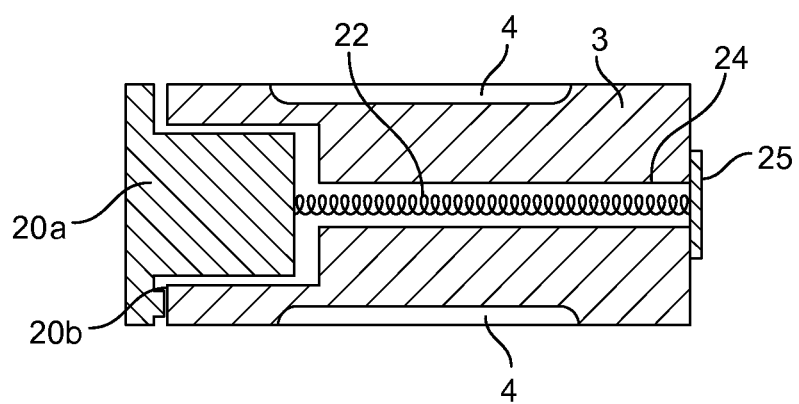
FIG. 5*b* shows a sectional side view of the preferred embodiment of the dosing member according to FIG. 5*a*.

FIGS. 5a and 5b show an alternative embodiment of a dosing device according to the present invention. Therein, tapping is achieved by a ratchet mechanism incorporated in the dosing member 3. Accordingly, a very space-saving embodiment of the tapping means is obtained. Thereby, the tapper 20 is connected to the dosing member 3 by means of a spring 22 which is guided within a circular bore 24 of the dosing member 3. The circular bore 24 is preferably coaxial to the axis of rotation of the dosing member 3.

The tapper 20 is preferably made from plastics by injection molding and comprises a circular member 20a having at least one protruding activation member 20b connected to it. The activation member 20b is preferably situated eccentric to the axis of rotation of the circular member 20a such that when the tapper is mounted at the dosing member 3, the activation member 20b protrudes in direction of the dosing member.

The tubular mounting portion 17 which houses the dosing member 3 comprises circumferential teeth 23 at a side portion 21 at which the tapper 20 is located. The teeth 23 are gradually inclined and distributed circumferentially in a uniform way. Hence, when being mounted at the dosing member 3, the activation member 20b of the tapper 20 is pressed against the side portion 21 by means of the spring 22. Thereby, the dosing member 3 preferably comprises a tightening device 25 for adjusting the tension of the spring 22.

When the dosing member 3 is rotated, the tapper 20 is gradually pulled outwards, i.e. away from the dosing member 3 by a ratchet effect due to the gradually inclined teeth 23 formed in the side portion 21 of the mounting portion 17. After the activation member 20b passes the protruding top portion of each tooth 23, the activation member 20b and hence, the tapper 20 are suddenly released which results in a sudden tap. Since the dosing member 3 is connected to the supply means 2, the force of the tap is induced on the supply means 2.

The amount of the teeth 23 is preferably in accordance with the amount of recessed portions 4 provided at the dosing member 3. Thereby, the teeth 23 and the activation member 21 are arranged with respect to the recessed portions 4 such that 1 tap occurs every time a recessed portion 4 is in a receiving position with respect to the supply means 2 of the device 1. Hence, the powder can be enforced to be discharged from the supply means 2 into the recessed portion 4 by the tapping.

In addition, an interlocking mechanism may be provided which prevents a twisting of the tapper 20 with respect to the dosing member 3. Said interlocking mechanism may be a groove or a protruding bar provided at the dosing member 3 and interlocking with a dedicated bar or groove provided at the tapper 20. Hence, the orientation of the tapper 20 with respect to the dosing member 3 can effectively be maintained during operation of the device 1.

FIG. 6 shows a sectional side view of a beverage preparation device 30 according to the present invention. The device 30 comprises a housing 30a containing at least a heater 31, a pump 32 and control means 14. Further the device comprises a liquid reservoir (not shown) connected to the device, an extraction chamber 33 and a base 34 which is preferably provided with feet 35 for standing the device 30 thereon in a stable manner. The device further comprises a stand 36 for a receptacle such as a cup 12 having an upper surface 36a provided with a grid 36b on which the receptacle 12 is positioned.

The liquid reservoir is provided in order to supply liquid such as water to the heater 31 and the pump 32, and hence to the extraction chamber 33 by means of an extraction element 13, for example a nozzle. The extraction element 13 is arranged within the extraction chamber 33. Moreover, the extraction chamber 33 is preferably equipped with powder supply means 39 which enable a provision of powder to the receptacle 12. The supply means 39 may be a vortex nozzle for example.

The extraction chamber 33 of the device further comprises a cover member 37 for selectively enclosing a receptacle 12 therein. Hence, an operator may open the cover member 37, place a receptacle in the extraction chamber 33 and close the cover member 37 again. Accordingly, a safe preparation of the beverage within the extraction chamber 33 is enabled.

In a preferred embodiment, the device 30 further comprises two supply means 2 which are housing two tin cans 11 of soluble powder. In order to enable a provision of powder from the tin cans 11, the tin cans 11 comprise an aperture 11a facing downwardly. Each of the supply means 2 comprise at least one aperture 2a through which powder may be supplied to dosing members 3 connected to the supply means 2. To each of the dosing members 3, a motor 10 is connected in order to enable a rotation of the dosing members 3 and hence, a discharging of powder from the supply means 2.

As two supply means are provided in the device, at least two different powders can be supplied in order to prepare different beverages. Of course, the number of supply means 2 and dosing members 3 within the device 30 may vary.

Powder which is discharged by the dosing members 30 is received by a hopper 40 which guides the powder from the dosing member 3 to the supply means 39 within the extraction chamber 33. Preferably, transportation means 41 are provided for enhancing the transportation of the powder within the hopper 40. Said transportations means 41 preferably comprise air generating means 15 for actively guiding a dose of powder supplied by the dosing member 3 to the supply means 39. The supply means 39 are preferably connected to the air generating means 15 for further supporting the transportation of powder into the receptacle 12.

The device 30 preferably comprises a single button 38 for starting the beverage preparation process. In addition, the device 30 may comprise additional buttons for selectively supplying either cold or hot water to the extraction chamber 33. Accordingly, a user can choose whether to prepare a cold or hot beverage.

The device further comprises a main switch (not shown) and a plurality of control indicators (not shown) which may inform the user about the operating status of the device 30.

During operation, the dosing members 3, the hopper 40, the transportation means 41 and the supply means 39 enable a provision of a predefined dose of soluble powder to the receptacle 12. After the powder has been supplied to the receptacle 12, a predefined amount of liquid such as water is provided to the receptacle 12 in order to interact with the dose of powder contained therein. Accordingly, a convenient and fast preparation of a beverage product is enabled by the device 30.

As different types of soluble powder can be provided to the device 30 by means of the tin cans 11, a multitude of beverages can be prepared by the device 30.

Although the present invention has been described with reference to preferred embodiments thereof, many modifications and alternations may be made by a person having ordinary skill in the art without departing from the scope of this invention which is defined by the appended claims.

For example, the pins 6, 6a may be removably connected to the dosing member. Moreover, additional pins or other activation members may be provided. Accordingly, the number of pins and their relative positions to each other may be varied. This is particular advantageous if the device is used for different powders of different concentrations. Accordingly, the tapping frequency can be adjusted to given needs in an easy and convenient way.

The invention claimed is:

1. A dosing device for the preparation of a food composition, the dosing device comprising:
   a supply member providing a soluble powder,
   a dosing member which is rotatably mounted on an axis of rotation and comprises at least one recessed portion for receiving the soluble powder in a first rotational position and discharging the soluble powder in a second rotational position,
   a motor that drives the dosing member to selectively connect the at least one recessed portion of the dosing member to the supply member, and
   a tapping member driven by the rotation of the dosing member and designed to induce a reciprocating movement of the supply member, the tapping member is located outside the supply member, the dosing member comprising an activation member for contacting and then releasing the tapping member, the activation member being a pin extending parallel to the axis of rotation of the dosing member, a first face of the dosing member is connected to the motor, the activation member is positioned on a second face of the dosing member opposite to the first face and protrudes from the second face in a direction away from the first face.

2. A dosing device according to claim 1, wherein the dosing member has a cylindrical form.

3. A dosing device according to claim 1, wherein the pin extends in an axial direction of the dosing member and is located eccentrically to the axis of the dosing member.

4. A dosing device according to claim 1, wherein the tapping member comprises an elastic member that is securely connected to the supply member such that in a neutral position of the elastic member no force is exerted on the elastic member.

5. A dosing device according to claim 4, wherein the activation member is designed to deflect the elastic member a predetermined extent compared to its original position and to suddenly release the deflected elastic member such that a reciprocating force is induced on the supply member.

6. A dosing device according to claim 1, wherein the at least one recessed portion is positioned on a lateral surface of the dosing member located between the first and second faces.

7. A dosing device according to claim 1, wherein at least one additional pin is positioned parallel to the pin.

8. A dosing device according to claim 1, wherein the supply member is a housing for receiving a vessel containing a soluble powder.

9. A dosing device according to claim 1, wherein the dosing member is connected to the supply member by a funnel-shaped element for guiding the soluble powder towards the dosing member.

10. A dosing device according to claim 1, wherein the dosing member comprises screw threads at either end of the recessed portion.

11. A dosing device according to claim 10, wherein the screw threads are orientated so as to be opposite to each other.

12. A system for the preparation of a food composition, the system comprising:
   a supply member for supplying a soluble powder to the system,
   at least one rotatable dosing member comprising a recessed portion for receiving and discharging a predefined dose of powder into a vessel,
   a motor that drives the dosing member to selectively connect the recessed portion of the dosing member to the supply member,
   a liquid supply member for providing liquid to the vessel for mixing the powder,
   a control member for controlling the angle of rotation and the rotational speed of the dosing member, and
   a tapping member located outside the supply member and driven by rotation of the dosing member so as to induce a reciprocating force on the supply member, the dosing member comprising an activation member for contacting and then releasing the tapping member, the activation member being a pin extending parallel to the axis of rotation of the dosing member, a first face of the dosing member is connected to the motor, the activation member is positioned on a second face of the dosing member opposite to the first face and protrudes from the second face in a direction away from the first face.

13. A method for tapping a supply member that is suitable for supplying a soluble powder to a dosing member comprising at least one recessed portion for receiving and discharging powder supplied by the supply member, wherein a rotational movement of the dosing member induces a force on the supply member resulting in a reciprocating movement of the supply member, the method comprises the steps of:
   driving the dosing member with a motor to selectively connect the at least one recessed portion of the dosing member to the supply member; and
   deflecting and releasing a tapping member connected to the supply member, the tapping member being located outside the supply member, the dosing member comprising an activation member that deflects and releases the tapping member, the activation member being a pin extending parallel to the axis of rotation of the dosing member, a first face of the dosing member is connected to the motor, the activation member is positioned on a second face of the dosing member opposite to the first face and protrudes from the second face in a direction away from the first face.

* * * * *